Figure 1:
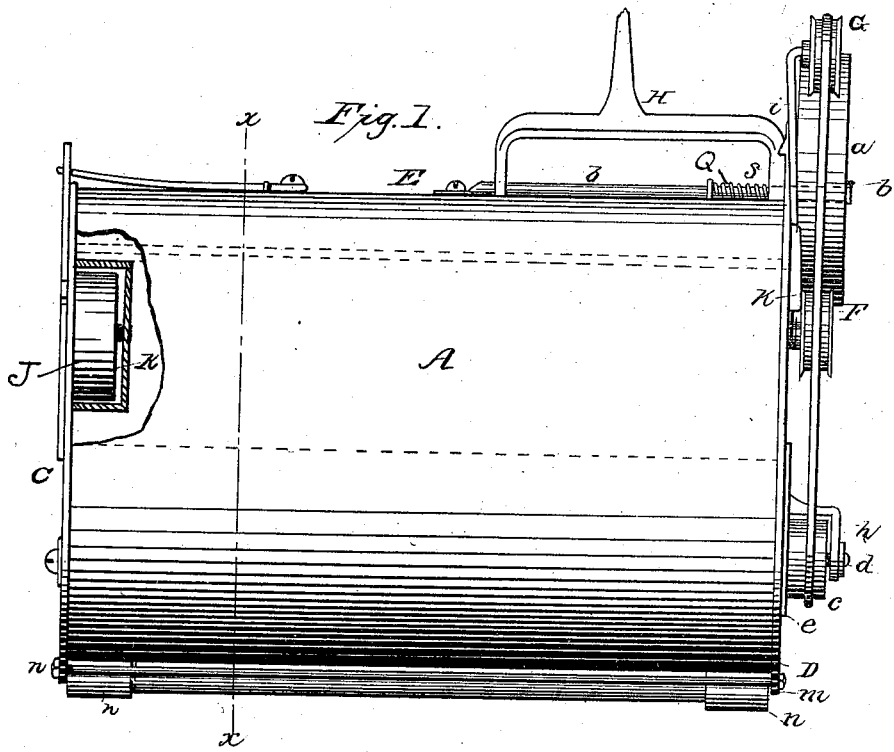

(No Model.)

4 Sheets—Sheet 1.

G. W. ZEIGLER.
CARPET SWEEPER.

No. 283,318. Patented Aug. 14, 1883.

Witnesses:
J. W. Reynolds, Jr.
E. M. Fowler.

Inventor
George W. Zeigler
per O. E. Duffy
att.

(No Model.) 4 Sheets—Sheet 2.
G. W. ZEIGLER.
CARPET SWEEPER.
No. 283,318. Patented Aug. 14, 1883.
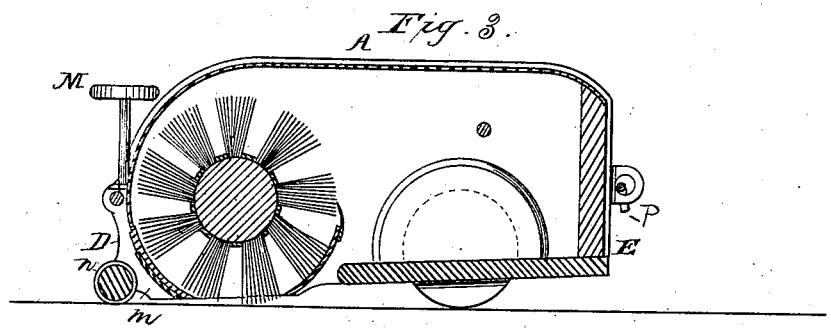
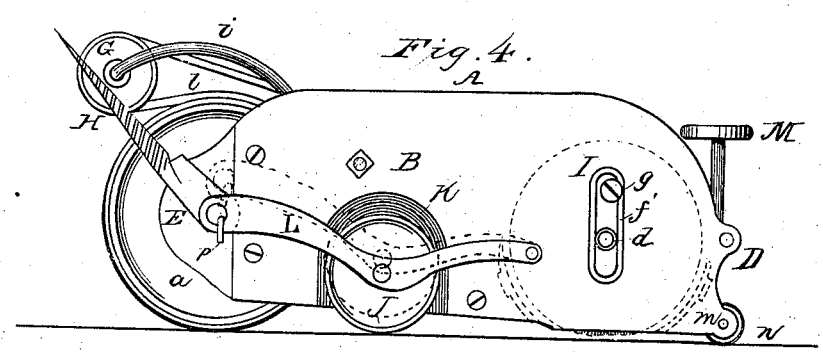
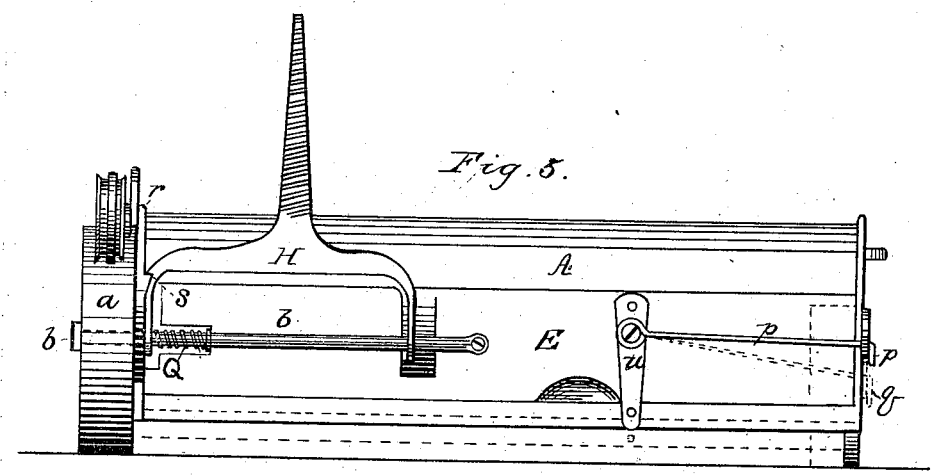
Witnesses
J. W. Reynolds Jr.
E. M. Fowler.
Inventor
George W. Zeigler
per O. E. Duff
Atty.

(No Model.)  
G. W. ZEIGLER.  
CARPET SWEEPER.  
No. 283,318. Patented Aug. 14, 1883.
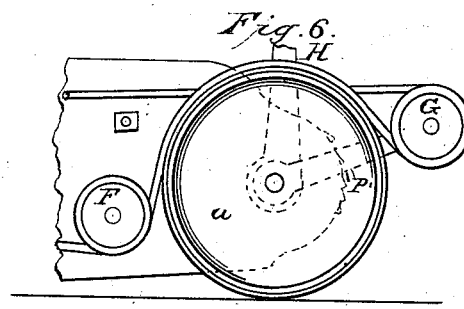
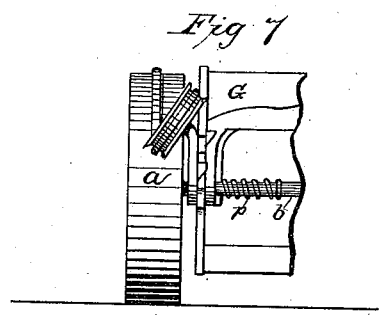
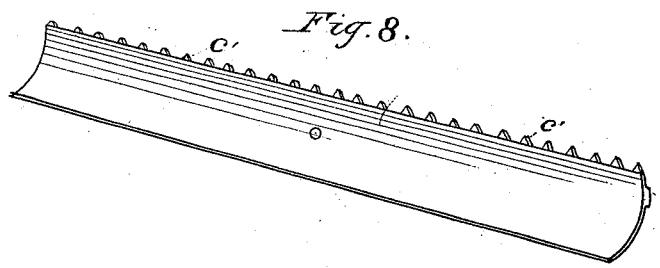
Witnesses  
J. W. Reynolds, Jr.  
E. M. Fowler.
Inventor.  
George W. Zeigler  
per O. E. Duffy  
att'y.

(No Model.) 4 Sheets—Sheet 4.
G. W. ZEIGLER.
CARPET SWEEPER.
No. 283,318. Patented Aug. 14, 1883.
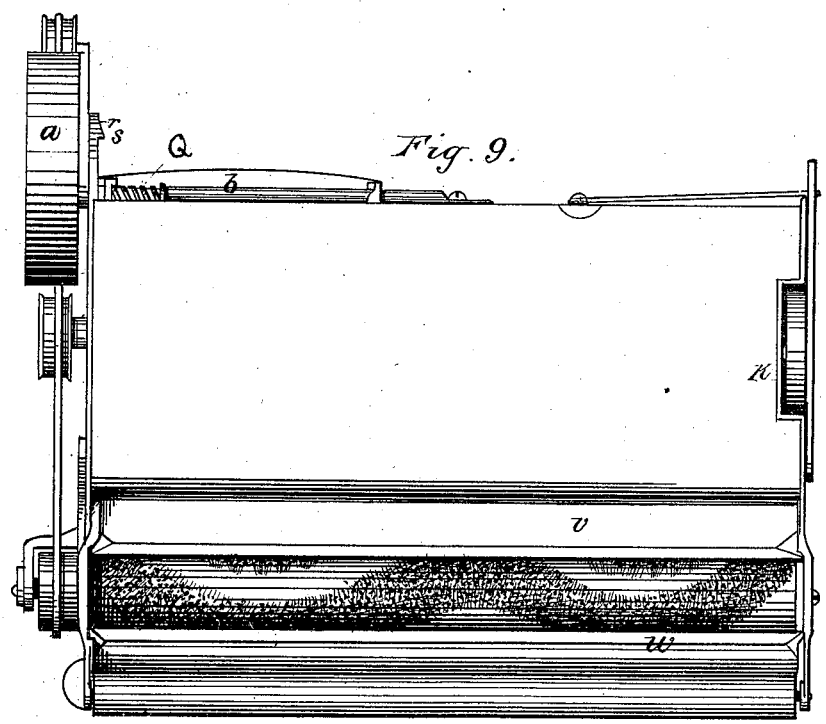
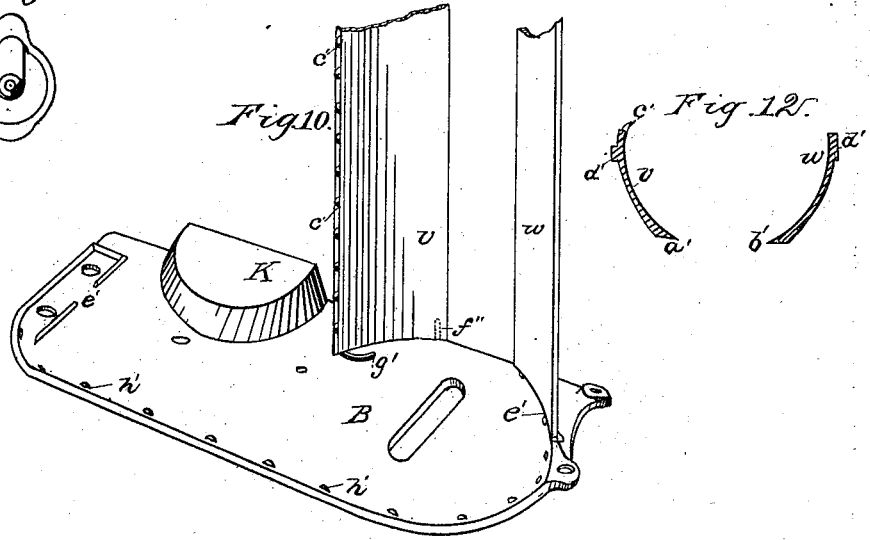
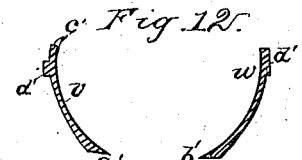
Witnesses:
J. W. Reynolds, Jr.
E. M. Fowler.
Inventor.
George W. Zeigler
per O. E. Duff
atty.

UNITED STATES PATENT OFFICE.

GEORGE W. ZEIGLER, OF NORWALK, OHIO.

CARPET-SWEEPER.

SPECIFICATION forming part of Letters Patent No. 283,318, dated August 14, 1883.

Application filed October 14, 1882. (No model.)

*To all whom it may concern:*

Be it known that I, GEORGE W. ZEIGLER, of Norwalk, in the county of Huron and State of Ohio, have invented certain new and useful Improvements in Carpet-Sweepers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to that class known as carpet "cleaners" or "sweepers," and has for its object to sweep carpets in such manner that not only the litter and dust is swept off, but the sand is also drawn into the dust-box.

It has for its object simplicity in construction, cheapness, durability, and effectiveness in its operation.

To this end the invention consists in the construction and arrangement of the various parts in such manner that the dust-box will yield to the irregularities of the floor, at the same time having the brush in its normal condition to sweep.

It further consists in the combination, with the driving-wheel of the brush, of a friction or traction wheel, and intermediate mechanism, whereby the driving-belt is considerably lengthened and its traction or frictional bearing on the motive power is thus increased.

It furthermore consists in the combination of the jaws or mouth-pieces with the end pieces, arranged in such manner that they may be readily fitted to their places interchangeably, and the rear mouth-piece automatically adjustable, said rear mouth-piece being also provided with teeth or serrations whereby the bristle of the brush is automatically cleaned.

It finally consists in the combination of the sweeper with the handle located in such position as to equalize the pressure and weight of the motive-power attachments with the weight and resistance of the main portion of the sweeper, and with a fender device, and also with other details of construction, as will be more fully hereinafter described, and pointed out in the claims.

Figure 2:
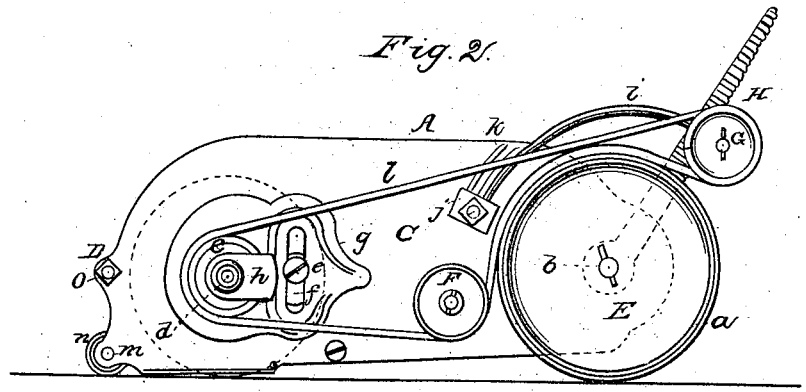

Referring to the accompanying drawings, Figure 1 represents a top or plan view of my improved carpet-sweeper, a portion of which is broken away to more clearly show the recess for one of the carrying-wheels, and also the wheel located therein. Fig. 2 is a side elevation, showing the outside working parts in position. Fig. 3 represents a longitudinal section taken on the line $x$ $x$ of Fig. 1. Fig. 4 illustrates an end elevation of the right-hand side of the machine. The purpose of this view is to particularly point out the yielding and self-adjusting journal-bar of the carrying-wheel. This figure also shows the rotary fender which prevents the machine from running so close to the wall or wash-boards as to injure them, and also to prevent the corners of the machine from bearing against the projections of the walls of the rooms. Fig. 5 represents a rear view of the apparatus. Fig. 6 shows a modified form of mounting my belt-tightener in side elevation. Fig. 7 is a rear view, in elevation, of Fig. 6, a portion of the machine being broken away. Fig. 8 is a detached view of one of the mouth-pieces or jaws. In this case it is the rear one having the serrated cleaning-teeth for cleaning the brush of any extraneous matter. Fig. 9 is an inverted illustration of the apparatus, in which is plainly seen the brush in position, the dust-mouth, and the knife-edge shape of the mouth-pieces. Fig. 10 is a detached detail view of the inside of the right-hand end of the machine, together with the dust mouth-pieces in perspective. Fig. 11 is a detail view of the adjustable journal-carrying piece of brush, and Fig. 12 is an end view of the jaws or mouth-pieces.

Like letters will denote like parts in all the figures.

A is the body of the sweeper. B is the right-hand end of the machine, and C the left-hand end. D is the front side, and E the rear.

It is essential to describe the ends and sides of the sweeper to a proper understanding of the case, for the reason that different parts belong to different sides and ends. Having this plan in view, I will commence at the left-hand end, to which is attached the motive power.

$a$ is the traction and driving wheel working on journals $b$.

$c$ is the driving-wheel of the brush; $d$, its journal or arbor. Upon the end C, I provide a casting, e, having an elongated slot, f, which slides, when to be adjusted, on screw g. Projecting outwardly from the casting e is an arm, h, which forms a bracket, and in this bracket h the journal of the shaft of the brush works, as does also the brush-driving wheel c. The object of elongating the slot f is to provide for adjusting the brush vertically upward or downward, according to wear of the brush.

F is an intermediate loose pulley fastened to the side C, and arranged below the axial line of the driving-wheel a, and G is a like wheel mounted upon a spring-arm, i, which is also secured to the end C by means of a bolt and nut, j, which is also the tie-rod holding the machine together.

The spring i rests in guide-pieces k, cast on the end C. This spring is adjusted to tighten the belt l, as may be required, and to also extend partly around the driving-wheel, whereby the frictional contact of the belt with the driving-wheel is extended. The size of the driving-wheel a and the brush-pulley c is calculated to give the brush the proper rotation or number of revolutions to properly sweep into the dust-box all the litter, sand, and dust. The shaft upon which the driving-wheel works is also the one upon which the handle H is fastened.

The end C projects beyond and in rear of the dust-box, as may be seen at E, Fig. 2, and in full lines at E, Fig. 4. This projection is for the purpose of a journal-support for the driving-wheel and a shaft for the operating-handle, as will be described further on. The end C also projects in point beyond the dust-box, as seen at m. This projection is for the purpose of forming a working-bearing for a roller, u. The object of roller u is to roll over any raw or uneven edges of the carpet, as well as litter, paper, &c., that may be on the floor, so that the brush may readily force it into the dust-box. It must be observed that no weight of the machine is ever upon this roller, its object being substantially as described. o is one of the bolts that hold the machine together. It will be further observed that the length of the belt is greatly extended by the mechanism shown on the end C, and that the contact of the belt is nearly one-half the surface of the driving-wheel, which increases its traction and therefore its adhesion, rendering it less liable to slip than when a less contact portion is used. It is also well known that the longer the belt is the greater is its adhesive power without further tightening the belt; and hence, by frictional contact with the driving-wheel and increased length of belt, I have a greater power than can otherwise be obtained. By this means, also, I prevent the belt working round the driving-wheel, so that it will last much longer than when in contact with the floor on one side and with the wheel on the other, and also prevent the belt-fastenings from tearing the carpet.

I will now proceed to describe the right-hand end, B, of the sweeper. (See Fig. 4.) The dotted lines I show the contour of the brush. f' shows an elongated slot corresponding to f in the end C. The screw g also serves a like purpose—i. e., for regulating or adjusting the brush to the floor as it wears.

J represents one of the carrying-wheels, which works in a recess, K, provided for that purpose. For my purpose it is important that the bearing-wheel on this the right-hand side should not project beyond the surface of the end, for the reason that I want the brush to sweep as close to the wall as possible. The recess K, projecting into the dust-box behind the brush, is not at all in the way, and it is also important all the journal-bearings be on the outside, out of the dust and sand, and in this they are prevented from cutting out. The working-bearing of wheel K is located in a bar, L, pivoted at one end, and fastened to a spring, p, at the other. The object of this is that, when the sweeper meets any obstruction or irregularity in the floor, said sweeper tips up at one end, the yielding bar permitting the body of the sweeper to rise and fall to the motion caused by its riding over the obstruction. If the wheel was fixed solid to the end without vertical motion, then when the machine met an obstruction it would drag it along, to the detriment of clean sweeping. The dotted lines q show comparatively the up-and-down movement of the sweeper over the wheel.

I will now proceed to describe the rear side, E, of the machine, upon which is located the handle H and its shaft b. As before stated, this shaft b also carries the driving-wheel a on the projection of end C. I locate in the rim r thereof a latch or catch, s, and upon the shaft b, I locate a spring, Q, of any approved kind. The object of this spring and catch is that when the handle H is thrown up the resilient force of the spring forces it into the latch, which retains it in an upright position when not in use, and also when the corners of the room are to be swept, as it will be seen, if the handle were down, a right-angled corner could not be swept, for the reason that the handle would not permit the machine to get into the corner, but when up the sweeper will run into the corner both ways. When the machine is to be used, and the position of the handle to be changed, the handle is slightly moved on the shaft against the tension of the spring, and then pulled down to the required position, when the sweeper may be pushed over the floor. The opening of the machine is at the bottom, and its closing-fastening is shown by the letter u, which also retains one end of spring p. The dotted lines q also show the up-and-down movement of the sweeper M on Figs. 3 and 4 shows an anti-friction or abrasion roller for preventing the abrasion of the walls and wash-boards when the sweeper is brought in close contact therewith.

Figs. 9, 10, and 12 show important features of my improved machine. Heretofore the mouth-piece or jaws v w have been made of tin or sheet-iron, and when they would strike an obstruction—such as a nail or other hard substance—they would become gapped or nicked on the edges in such manner as to render them extremely objectionable, inasmuch as these rough niches turned down would rip and tear the carpet. With mine I make the portion at the mouth thicker, and bevel them off to a knife-edge. This may be done by casting or otherwise. These edges a' b' are hardened to such a degree that nails do not injure them. The bevels forming the knife-edge form bearings for the machine, and are so narrow that they pinch the cloth of the carpet between them, and thus the brush draws the dust and sand into the box. The jaws, when broad, bear the carpet away from the brush, and thus it is frequently passed over without a thorough cleaning. The jaw v is also provided with saw-like teeth or serrations c' c', in its upper edge, (see Figs. 8, 10, and 12,) for the purpose of automatically cleaning any extraneous or fibrous matter from the brush as it revolves, thus keeping it always in good working condition. The jaws v w are also provided with projections d' d', which fit into corresponding recesses e' e' in the ends or heads B C, and are thus rigidly held in position. Jaw v, however, is arranged on a pivot, f''', which has also a projection working in slot g', so that it adapts itself to the wear of the brush, so that the teeth c' may continue to keep the brush clean. All these parts are very essential to a perfect working machine. Around the periphery or outer flange of the end piece will be seen a series of "teats" or small projections, h' h'. Usually the custom is to cast a double flange for the reception of the sheet-iron top; but I find when molding them, and when the pattern is to be withdrawn from the sand, the loosening of the pattern breaks the mold of the inner flange, thus spoiling many heads or ends for use. With these teats h' h' on the pattern the loosening of it I find does not affect them, and therefore no loss occurs; and, moreover, the teats answer my purpose better than the double flange did, for it is less trouble to fit the sheet-iron top. The inside view of this Fig. 10 clearly shows the inwardly-projecting recess K for the carrier-wheel to work in.

The operation is as follows: It will be seen that the handle is located at one end of the machine. The object of thus placing it is to balance the weight of the machine against the motive-power attachments. Should the handle be placed in the middle, the machine, when pushed, would constantly slant to one side. The present position of the handle is calculated to nicely balance the weight of the machine, the force of resistance, and the power exerted in working the machine, so that it will run perfectly smooth and straight. When the brush is set for work, it should be adjusted at the end bearings for the brush to just touch the floor or carpet. Its peculiar function is to sweep and draw in the dust or sand by means of the current of air created by the velocity of the brush when in operation. Thus when in use the dust is prevented from rising and flying about the room, which is a great desideratum to housekeepers, for it is well known the damaging effect it has on various articles.

When the modifications shown by Figs. 6 and 7 are used, the spring i (shown on Fig. 2) is dispensed with, the arm P' being mounted upon the driving-wheel arbor, the weight of the pulley G being sufficient to maintain the belt in a taut position. In this instance the arm P' is located between the driving-wheel and the box, the belt-wheel G being arranged at such angle as to cause the belt to be brought in contact with the driving-wheel a, the handle H of course being in the same position as before described.

It is evident that modifications may be made within wide limits without departing from the spirit of my invention. I do not therefore desire to be confined to the exact forms and proportions shown.

I am aware that it is not new to provide means whereby a carpet-sweeper handle may be maintained in an upright position when not in use. That has been done by means of a bifurcated handle and two trunnioned lugs, one of said lugs being provided with a recess to secure the handle in an upright position, the trunnion on the other lug being provided with a spiral spring adapted to force the handle sidewise into the securing-recess when said handle is placed in a vertical position.

I am also aware that it is not new in carpet sweepers to lengthen the belt and run the same over a series of pulleys.

I am also aware that it is not new to form the mouth of carpet-sweepers with beveled edges. I therefore do not claim such mechanism, broadly.

I am aware, further, that adjustable jaws are not new in carpet-sweepers, and that jaws provided with brush-cleaning teeth have been employed.

Having described the best means at present known to me for carrying my invention into effect, what I claim as new, and desire to secure by Letters Patent, is—

1. In a carpet-sweeper, the combination of a driving-wheel, of the brush and its pulley, of an intermediate loose pulley, and of a loose pulley maintained above and back of the vertical center of the driving-wheel, whereby the driving-belt is brought only in contact with the upper periphery of said driving-wheel, substantially as set forth.

2. In a carpet-sweeper, the combination of a driving-wheel, of the brush and its pulley, of an intermediate loose pulley, of an adjustable spring-arm, provided on its outer end with a pulley, and a driving-belt, substantially as described, and for the purposes set forth.

3. In a carpet-sweeper, the driving-wheel, loose side pulley, and adjustable spring-arm, provided with a loose pulley on the rear end thereof, as shown and specified, in combination with a driving-belt, the brush and its pulley, and the vertically-adjustable side castings, substantially as and for the purposes set forth.

4. In a carpet-sweeper, the shaft $b$, secured to the rear of the machine and having a bearing in the end frame, said frame being provided with catch $s$, and the shaft $b$ having a spring, Q, as specified, in combination with the handle H, whereby said handle may be retained in an upright position when not in use, substantially as set forth.

5. In a carpet-sweeper, the curved jaws $v\,w$, provided with bevel-edges on their lower sides, and also provided with projections $d'\,d'$, the jaw $v$ having the teeth $c'$, pivot $f'''$, and a projection adapted to work in slot $g'$, whereby said jaw is adapted to adjust itself to the wear of the brush, substantially as described, and for the purposes set forth.

6. In a carpet-sweeper, the curved jaws $v\,w$, provided with bevel-edges on their lower sides, and also provided with projections $d'\,d'$, the jaw $v$ having the teeth $c'$, pivot $f'''$, and a projection adapted to work in slot $g'$, as specified, in combination with the sides B C, provided with curved grooves adapted to receive the jaws, substantially as described, and for the purposes set forth.

7. The combination, in a carpet-sweeper, of end head, B', provided with recess K, with carrying-wheel J, having its journal-bearing in a pivoted spring-bar, whereby either the body A or the said wheel J may have vertical motion irrespective of the other, substantially as described, and for the purpose set forth.

8. The combination of the motive-power wheel $a$, shaft $b$, latch $s$, spring Q, and handle H, as set forth.

9. In a carpet-sweeper, the combination of the box end B, having recess K, wheel J, pivoted bar L, and spring $p$, operating together, as described.

10. In a carpet-sweeper, the end B, provided with a roller or anti-abrasion wheel, M, mounted at the forward end thereof, whereby that end of the machine is prevented from engaging the wall or base-board, said wheel serving as a cushion to receive the shock, substantially as set forth.

11. In a carpet-sweeper, the body mounted upon a driving-wheel at one end, and provided on the other end with a wheel journaled in a vibrating bar, and a forward roller, whereby a part of the machine is given a yielding or spring support, as set forth.

12. In a carpet-sweeper, the combination consisting of the end piece, C, casting $e$, having bracket $h$, spring-holding device K, secured to the side of the machine, and wheels $a$ and $c$, with the spring $i$ and belt $l$, as shown and described.

13. In a carpet-sweeper, the combination of the wheels $a$ and $c$, loose wheels F and G, spring $i$, belt $l$, and handle H, located at the rear end and one side of the machine, as described.

In testimony that I claim the foregoing as my own I affix my signature in presence of two witnesses.

GEORGE W. ZEIGLER.

Witnesses:
EUGENE D. CARUSI,
EDWARD E. ELLIS.